United States Patent
Stegman et al.

(10) Patent No.: US 8,183,992 B2
(45) Date of Patent: May 22, 2012

(54) COMPREHENSIVE STATUS INDICATOR FOR MOTOR VEHICLE MONITORING SYSTEM

(75) Inventors: Jeffrey Stegman, Cincinnati, OH (US); Scott Comisar, Plano, TX (US)

(73) Assignee: Doran Manufacturing LLC, Cincinnati, OH (US)

( * ) Notice: Subject to any disclaimer, the term of this patent is extended or adjusted under 35 U.S.C. 154(b) by 289 days.

(21) Appl. No.: 12/269,025

(22) Filed: Nov. 11, 2008

(65) Prior Publication Data

US 2009/0121857 A1    May 14, 2009

Related U.S. Application Data

(60) Provisional application No. 60/987,092, filed on Nov. 11, 2007.

(51) Int. Cl.
*B60C 23/02* (2006.01)

(52) U.S. Cl. ........ 340/442; 340/444; 340/445; 340/447; 340/539.1; 340/10.1; 340/10.4; 73/146; 73/146.5

(58) Field of Classification Search ............ 340/442, 340/444, 445, 447, 539.1, 825.49, 10.1, 10.4; 73/146, 146.5
See application file for complete search history.

(56) References Cited

U.S. PATENT DOCUMENTS

| | | | | |
|---|---|---|---|---|
| 4,319,220 | A * | 3/1982 | Pappas et al. | 340/447 |
| 6,385,553 | B1 * | 5/2002 | Naito et al. | 702/138 |
| 6,507,276 | B1 * | 1/2003 | Young et al. | 340/447 |
| 7,015,801 | B1 * | 3/2006 | Juzswik | 340/442 |
| 7,388,478 | B2 * | 6/2008 | Watabe | 340/442 |

* cited by examiner

*Primary Examiner* — George Bugg
*Assistant Examiner* — Sisay Yacob
(74) *Attorney, Agent, or Firm* — Wm. Cates Rambo

(57) ABSTRACT

In a tire sensor monitoring system for a motor vehicle, each of a plurality of tire sensors periodically emits an identifying signal and a parameter signal and the monitoring system receives and processes the identifying and parameter signals. A method of indicating the status of the monitoring system comprises periodically determining whether the identifying and parameter signals emitted by the tire sensors are being received within preselected time limits, energizing a status indicator if all of said identifying and parameter signals are received within the preselected time limits, de-energizing the status indicator if any of said identifying and parameter signals is not received within the preselected time limits, periodically determining whether the parameter signals emitted by the tire sensors are within a preselected range of values, energizing the status indicator if all of said parameter signals are within the preselected range of values; and de-energizing the status indicator if any of said parameter signals is outside the preselected range of values.

3 Claims, 1 Drawing Sheet

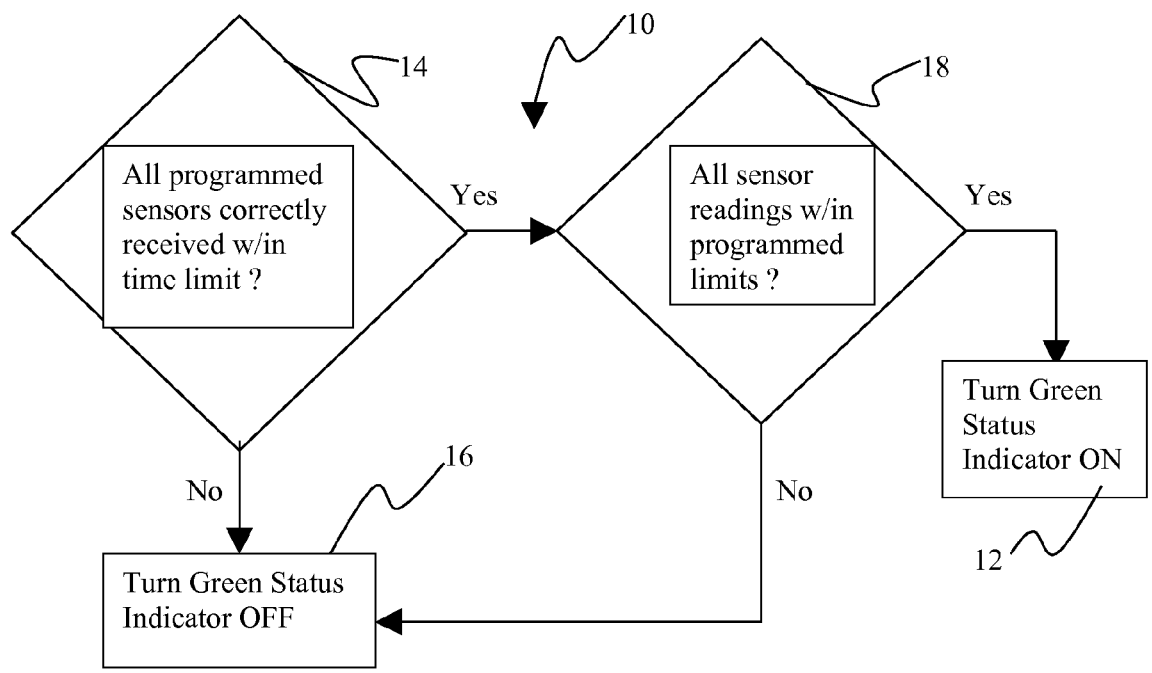

COMPREHENSIVE STATUS INDICATOR FOR MOTOR VEHICLE MONITORING SYSTEM

RELATED APPLICATION

The present application is related to U.S. Provisional Application No. 60/987,092 filed Nov. 11, 2007 in the names of the above-identified inventors.

TECHNICAL FIELD

The present invention relates to electronic apparatus for sensing and informing the operator of one or more conditions, such as tire pressure, on a motor vehicle, and more particularly to apparatus and a method for informing the operator of the overall status of the monitoring system.

BACKGROUND ART

Typically, when something goes wrong with a tire pressure monitoring system (TPMS), a visual and/or audible alert is provided by the monitor to the operator. In this manner, the operator is informed when the tire pressure or other parameter is outside pre-established limits or when the sensor is inoperative. However, in the condition or situation where all of the sensors are operating properly and all of the parameters being measured are within limits, no indicators are provided. In some monitoring systems, the display actually goes blank after a period of time when everything being monitored is operating properly. The problem with the foregoing arrangement is the operator cannot tell at a glance whether the monitored parameters are operating satisfactorily or whether the TPMS has failed or shut itself off due to a system defect.

SUMMARY OF THE INVENTION

The present method indicates the status of a tire sensor monitoring system for a motor vehicle. Each of a plurality of tire sensors periodically emits an identifying signal and a parameter signal and the monitoring system receives and processes the identifying and parameter signals. The present method comprises the steps of periodically determining whether the identifying and parameter signals emitted by the tire sensors are being received within preselected time limits, energizing a status indicator if all of the identifying and parameter signals are received within the preselected time limits, de-energizing the status indicator if any of the identifying and parameter signals is not received within the preselected time limits, periodically determining whether the parameter signals emitted by the tire sensors are within a preselected range of values, energizing the status indicator if all of said parameter signals are within the preselected range of values, and de-energizing the status indicator if any of said parameter signals is outside the preselected range of values.

BRIEF DESCRIPTION OF DRAWING

FIG. 1 is a flow chart of an illustrative embodiment of apparatus and method of providing a comprehensive status indicator for a motor vehicle monitoring system.

DETAILED DESCRIPTION OF EXEMPLARY EMBODIMENT

As illustrated in FIG. 1, the present method and apparatus for providing a comprehensive status indicator, generally designated 10, lets the operator know at a glance that the monitoring system is operating properly and that the sensed parameters are within a preselected range. In addition, it does so for as long as the motor vehicle is running or until something goes wrong in the monitoring system. The present method and apparatus are preferably in addition to, rather than a replacement for, conventional visual and/or audible indicators which inform the operator of the problem with more particularity.

Preferably, the present status indicator is a green light-emitting diode 12, and the present method comprises the following steps. First, the TPMS periodically queries whether signals from all of the programmed sensors have been correctly received within a preselected time limit 14. If not, the green light does not come on at start-up or, if the TPMS has been running properly, the green light is turned off 16. If, on the other hand, the sensor signals have been correctly and timely received, the TPMS queries whether all of the sensor readings are within the preselected limits 18. If they are, the green light is turned on at start-up or, if the TPMS has already been operating properly, the green light stays on 12. If, on the other hand, one or more of the sensor readings is outside the limits, the green light does not come on at start-up or is turned off if the TPMS has been operating for some time 16.

Accordingly, if the green light 12 is on, the operator knows, at a glance, that the TPMS is operating properly and all sensed parameters are within limits. If the green light 12 goes off while the motor vehicle is running, the operator knows at a glance that something is wrong and can look to the other TPMS indicators to determine the nature of the problem with more particularity.

The invention claimed is:

1. A method of indicating the status of a tire sensor monitoring system for a motor vehicle, wherein each of a plurality of tire sensors periodically emits an identifying and parameter signal and a monitor receives and processes the identifying and parameter signals when the tire sensors and the monitor are operating properly, said method comprising:
   (a) periodically determining whether the identifying and parameter signals emitted by the tire sensors are being received by the monitor within a pre-selected time limit;
   (b) periodically determining whether the parameter signals emitted by the tire sensors and processed by the monitor are within a pre-selected range of values;
   (c) energizing a single status indicator if:
      (i) all of the identifying and parameter signals of step (a) are received within the pre-selected time limit; and
      (ii) all of the parameter signals of step (b) are within the pre-selected range of values; and
      (iii) the tire sensors and monitor are operating properly; and
   (d) de-energizing said single status indicator if:
      (i) any of the said identifying and parameter signals is not received within the pre-selected time limit; or
      (ii) any of said parameter signals is outside the pre-selected range of values; or
      (iii) any of the tire sensors or monitoring system is not operating properly.

2. The method according to claim 1, wherein the status indicator comprises a monochromatic light emitting diode located on a display portion of the monitor.

3. A method of indicating the status of a tire sensor monitoring system for a motor vehicle, wherein each of a plurality of tire sensors periodically emits an identifying and parameter signal and a monitor receives and processes the identifying and parameter signals when the tire sensors and the monitor are operating properly, said method comprising:

(a) periodically determining whether the identifying and parameter signals emitted by the tire sensors are being received by the monitor within a pre-selected time limit;
(b) periodically determining whether the parameter signals emitted by the tire sensors and processed by the monitor are within a pre-selected range of values;
(c) energizing a monochromatic light emitting diode located on a display portion of the monitor if:
　(i) all of the identifying and parameter signals of step (a) are received within the pre-selected time limit; and
　(i) all of the parameter signals of step (b) are within the pre-selected range of values; and
　(iii) the tire sensors and monitor are operating properly; and
(d) de-energizing said monochromatic light emitting diode if:
　(i) any of the said identifying and parameter signals is not received within the pre-selected time limit; or
　(ii) any of said parameter signals is outside the pre-selected range of values: or
　(iii) any of the tire sensors or the monitor is not operating properly.

\* \* \* \* \*